US012574576B1

(12) United States Patent
Chen

(10) Patent No.: US 12,574,576 B1
(45) Date of Patent: Mar. 10, 2026

(54) LIVE STREAMING-BASED INTERACTIVE METHOD AND SYSTEM

(71) Applicant: UC GLOBAL TRADE INC., Chino, CA (US)

(72) Inventor: Junjun Chen, Shenzhen (CN)

(73) Assignee: UC GLOBAL TRADE INC., Chino, CA (US)

( * ) Notice: Subject to any disclaimer, the term of this patent is extended or adjusted under 35 U.S.C. 154(b) by 0 days.

(21) Appl. No.: 19/246,756

(22) Filed: Jun. 24, 2025

(30) Foreign Application Priority Data

May 28, 2025    (CN) .......................... 202510708653.3

(51) Int. Cl.
| | |
|---|---|
| *H04N 21/2187* | (2011.01) |
| *H04N 21/234* | (2011.01) |
| *H04N 21/25* | (2011.01) |
| *H04N 21/254* | (2011.01) |

(52) U.S. Cl.
CPC ....... *H04N 21/254* (2013.01); *H04N 21/2187* (2013.01); *H04N 21/23424* (2013.01); *H04N 21/252* (2013.01)

(58) Field of Classification Search
CPC ................................................. H04N 21/2187
See application file for complete search history.

(56) References Cited

U.S. PATENT DOCUMENTS

| | | | | |
|---|---|---|---|---|
| 2025/0056078 A1* | 2/2025 | Hsu | ....................... | H04N 21/251 |
| 2025/0203176 A1* | 6/2025 | Hsieh | ................. | H04N 21/4312 |

FOREIGN PATENT DOCUMENTS

| | | |
|---|---|---|
| CN | 106231415 A | 12/2016 |
| CN | 111182355 B | 5/2021 |
| CN | 113596493 A | 11/2021 |
| CN | 114567793 A | 5/2022 |
| CN | 114760519 B | 9/2024 |

* cited by examiner

*Primary Examiner* — Michael H Hong
(74) *Attorney, Agent, or Firm* — Ming Jiang; OPENPTO US LLC

(57) ABSTRACT

A live streaming-based interactive method includes the following steps: receiving interaction data of users; where the users are viewers watching a target live streaming room on a live streaming platform; determining an audience emotional atmosphere in the target live streaming room based on the interaction data; determining live streaming visual effects based on the audience emotional atmosphere; and compositing the live streaming visual effects with a live streaming video to generate a composite live streaming video, and transmitting the composite live streaming video to the live streaming platform. The user can watch the composite live streaming video via the target live streaming room. The method can strengthen the users' willingness to participate in the interaction, attracting more and more viewers to participate in the interaction. Moreover, the live streaming visual effects generated by the audience emotional atmosphere can provide emotion-driven visual effects matching strategy.

18 Claims, 4 Drawing Sheets

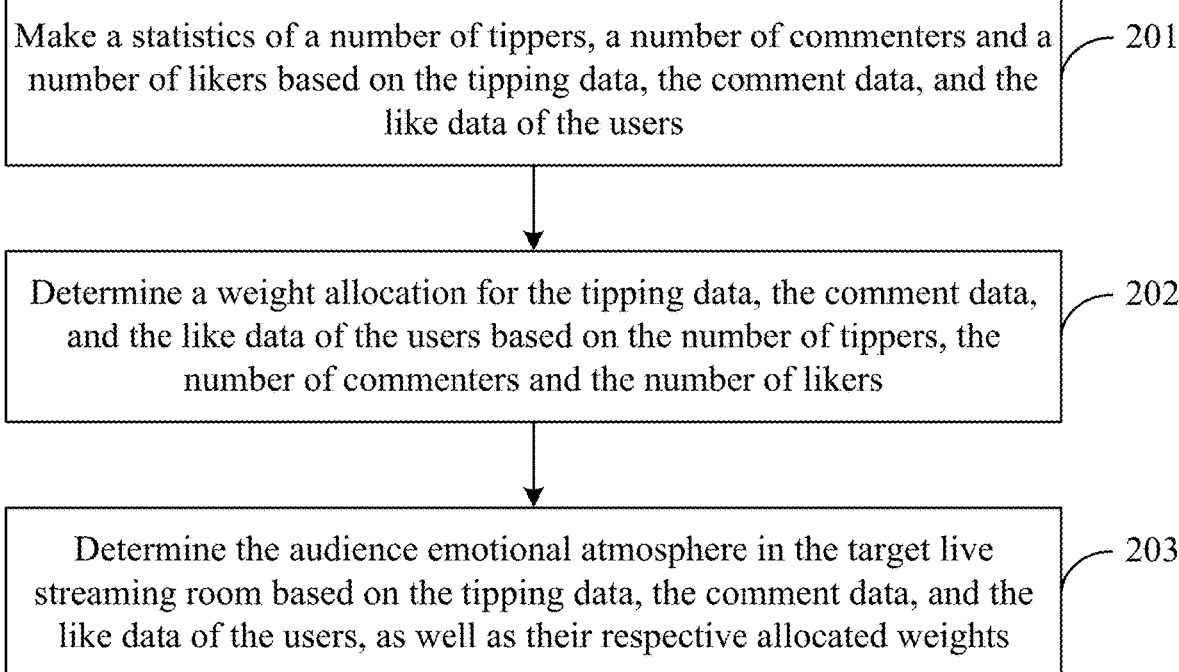

Make a statistics of a number of tippers, a number of commenters and a number of likers based on the tipping data, the comment data, and the like data of the users — 201

Determine a weight allocation for the tipping data, the comment data, and the like data of the users based on the number of tippers, the number of commenters and the number of likers — 202

Determine the audience emotional atmosphere in the target live streaming room based on the tipping data, the comment data, and the like data of the users, as well as their respective allocated weights — 203

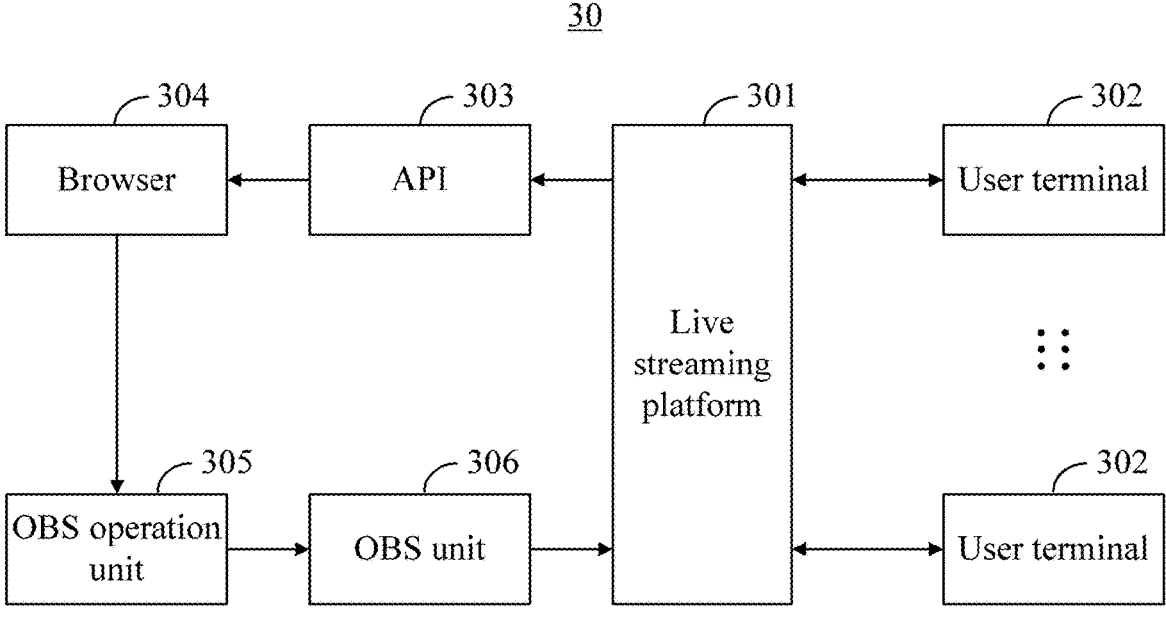

FIG. 3

LIVE STREAMING-BASED INTERACTIVE METHOD AND SYSTEM

CROSS REFERENCE TO RELATED APPLICATIONS

The present application claims priorities of Chinese Patent Application No. 2025107086533, filed on May 28, 2025, the contents of which are hereby incorporated by reference in entirety.

TECHNICAL FIELD

The present disclosure relates to the technical field of live streaming processing, and in particular to a live streaming-based interactive method and system.

BACKGROUND

Live streaming is a form of real-time interactive entertainment, in which a streamer can transmit live videos and audios to online viewers in real time through cameras, microphones, and network technology. Viewers can participate in the interaction in real time by posting comments, giving likes, and sending virtual gifts. Live streaming has become one of the most popular forms of entertainment in the digital age.

Studies have shown that the visual presentation of live streaming interactions mainly relies on viewer participation by sending virtual gifts at present. Live streaming platforms usually selectively display only a portion of the virtual gifts from the viewers on the live streaming screen. The gifts are usually presented based on the value of the gifts. For example, high-value virtual gifts such as "rockets" or "planes" are prominently displayed, while lower-value gifts such as "tokens" or "flowers" are omitted or shown less prominently.

Therefore, users can only send virtual gifts on their own to have them displayed during the live streaming, which results in a single form of visual interaction presentation and poor interactive visual effect. As a result, users have no desire to participate in a live streaming room for interaction, which makes the existing interactive methods unable to boost the atmosphere, engagement, and appeal of the live streaming room.

SUMMARY

In order to solve the above technical problems, the present disclosure provides a live streaming-based interactive method and system.

In a first aspect, the present disclosure provides a live streaming-based interactive method, including: receiving interaction data of users; where the users are viewers watching a target live streaming room on a live streaming platform; determining an audience emotional atmosphere in the target live streaming room based on the interaction data; determining live streaming visual effects based on the audience emotional atmosphere; and compositing the live streaming visual effects with a live streaming video to generate a composite live streaming video, and transmitting the composite live streaming video to the live streaming platform, such that the user can watch the composite live streaming video via the target live streaming room.

Optionally, the interaction data includes at least one of tipping data, comment data, and like data.

Optionally, the interaction data includes the tipping data, and the audience emotional atmosphere in the target live streaming room is determined based on a number of user tips within a first target time period.

Optionally, the interaction data includes the tipping data, and the audience emotional atmosphere in the target live streaming room is determined based on a number of tippers within a second target time period.

Optionally, the interaction data includes the tipping data, and the audience emotional atmosphere in the target live streaming room is determined based on a frequency of tips in the target live streaming room.

Optionally, the interaction data includes the tipping data, and the audience emotional atmosphere in the target live streaming room is determined based on a continuous tipping duration in the target live streaming room.

Optionally, the audience emotional atmosphere includes an audience emotional atmosphere category.

Optionally, the audience emotional atmosphere also includes an audience emotional change trend.

Optionally, the determining live streaming visual effects based on the audience emotional atmosphere specifically includes: determining the live streaming visual effects based on the audience emotional atmosphere and tipping gifts from the users.

Optionally, determining the live streaming visual effects based on the audience emotional atmosphere and tipping gifts from the users includes: determining a visual effect processing mode for the tipping gifts from the users based on the audience emotional atmosphere; and processing the tipping gifts from the users based on the visual effect processing mode; where the processed tipping gifts from the users are the live streaming visual effects.

Optionally, the visual effect processing mode includes a gift magnification ratio or a gift composition method.

Optionally, the compositing the live streaming visual effects with a live streaming video includes: adding the live streaming visual effects to a first region in the live streaming video; adding the tipping gifts from the users to a second region in the live streaming video; where the first region and the second region are located at different positions in the live streaming video.

Optionally, the first region corresponds to a central area of the live streaming video, and the second region corresponds to a top area of the live streaming video or a bottom area of the live streaming video.

Optionally, the live streaming visual effects may include at least one of the following: gift visual effects, action visual effects, facial expression visual effects, text visual effects, user ID visual effects, background visual effects, and streamer ornament visual effects.

Optionally, the interaction data includes at least one of tipping data, comment data, and like data, and the determining an audience emotional atmosphere in the target live streaming room based on the interaction data includes making a statistics of a number of tippers, a number of commenters and a number of likers based on the tipping data, the comment data, and the like data of the users; determining a weight allocation for the tipping data, the comment data, and the like data of the users based on the number of tippers, the number of commenters and the number of likers; and determining the audience emotional atmosphere in the target live streaming room based on the tipping data, the comment data, and the like data of the users, as well as their respective allocated weights.

Optionally, the determining live streaming visual effects based on the audience emotional atmosphere include: determining visual effects matching the audience emotional atmosphere from a pre-constructed mapping table; where the pre-constructed mapping table includes visual effects corresponding to different audience emotional atmospheres; where the matched visual effects are the live streaming visual effects.

Optionally, in the pre-constructed mapping table, one audience emotional atmosphere corresponds to at least two different visual effects.

Optionally, the determining visual effects matching the audience emotional atmosphere from a pre-constructed mapping table may include randomly determining one visual effect matching the audience emotional atmosphere from the pre-constructed mapping table.

Optionally, the determining visual effects matching the audience emotional atmosphere from a pre-constructed mapping table may further include determining at least two visual effects matching the audience emotional atmosphere from the pre-constructed mapping table; and determining the live streaming visual effects for compositing from the at least two visual effects matching the audience emotional atmosphere based on a duration of the live streaming.

In a second aspect, the present disclosure provides a live streaming-based interactive system, including: a receiving module configured to receive interaction data of users; where the users are viewers watching a target live streaming room on a live streaming platform; an atmosphere determination module configured to determine an audience emotional atmosphere in the target live streaming room based on the interaction data; a visual effect determination module configured to determine live streaming visual effects based on the audience emotional atmosphere; and an interaction module configured to composite the live streaming visual effects with a live streaming video to generate a composite live streaming video, and transmitting the composite live streaming video to the live streaming platform, such that the users can watch the composite live streaming video via the target live streaming room.

Beneficial effects of the present disclosure include: the present disclosure provides a live streaming-based interactive method, which can determine an audience emotional atmosphere in the target live streaming room based on interaction data of a user in the target live streaming room, and then generate different live streaming visual effects to be presented in the live streaming video based on different audience emotional atmospheres. Through the method, bidirectional feedback between user interaction and the live streaming atmosphere is achieved. Each user interaction is used as a contribution to the presented live streaming visual effects, such that the presented live streaming visual effects are strongly associated with the user interaction, enhancing user immersion during the live streaming process and increasing user stickiness. Furthermore, the interactive method can strengthen the users' willingness to participate in the interaction, attracting more and more viewers to participate in the interaction. Moreover, the live streaming visual effects generated by the audience emotional atmosphere in the live streaming room can provide emotion-driven visual effects matching strategy. In terms of visual presentation, an atmosphere-based visual effect has stronger impact than the traditional method of tipping gift only.

BRIEF DESCRIPTION OF THE DRAWINGS

FIG. 2 is a flowchart of steps of another live streaming-based interactive method according to an embodiment of the present disclosure.

FIG. 3 is a block diagram of a live streaming system according to an embodiment of the present disclosure.

DETAILED DESCRIPTIONS OF THE EMBODIMENTS

In the following description, specific details such as particular system structures and technology are provided for the purpose of illustration rather than limitation, so as to facilitate a thorough understanding of the embodiments of the present disclosure. However, it should be clear to those skilled in the art that the present disclosure may be implemented in other embodiments without these specific details. In other instances, detailed descriptions of well-known systems, devices, circuits, and methods are omitted to avoid unnecessary details that might obscure the description of the present disclosure.

In addition, in the description of the specification and the appended claims of the present disclosure, the terms "first", "second", "third", etc. are merely for distinguish between descriptions and may not be understood as indication or implication of relative importance.

Studies have found that the visual presentation of live streaming interaction mainly relies on viewers participating by sending virtual gifts at present. For the virtual gifts sent by viewers, live streaming platforms usually selectively display only a portion of the virtual gifts on the live streaming screen. The gifts are usually presented based on prices of the gifts. For example, high-value virtual gifts such as "rockets" or "planes" sent by the viewers are generally displayed in the live streaming screen, while lower-value gifts such as "tokens" or "flowers" are omitted or weakened.

Therefore, users can only independently send virtual gifts to have them presented during the live streaming. This method results in a single form of visual interaction presentation and poor interactive visual effect. As a result, users have no desire to join a live streaming room for interaction, which makes the existing interactive methods unable to boost the atmosphere, engagement, and appeal of the live streaming room.

The present disclosure provides the following embodiments to solve the above problems.

Figure 1:
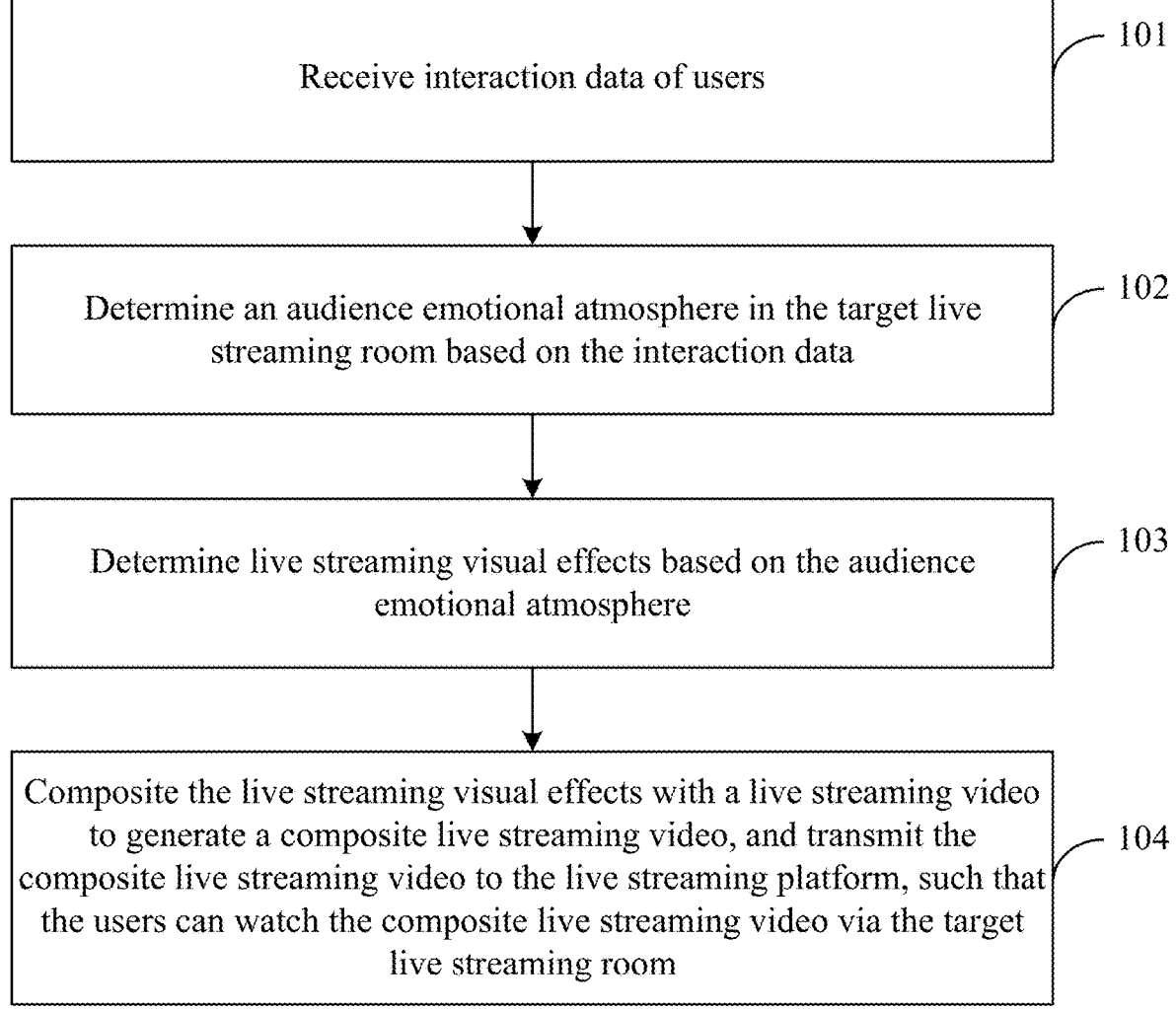
FIG. 1 is a flowchart of steps of one live streaming-based interactive method according to an embodiment of the present disclosure.

With reference to FIG. 1, an embodiment of the present disclosure provides a live streaming-based interactive method, including steps 101-104.

Step 101: receiving interaction data of users.

Specifically, the users are viewers watching a target live streaming room on a live streaming platform.

Generally, the live streaming platform includes a plurality of live streaming rooms, and each of the live streaming rooms is hosted by a streamer to broadcast different live streaming content. Viewers can enter the live streaming rooms of their respective favorite streamers to watch the live streaming content and interact in the live streaming room, generating interaction data. In this step, the interaction data generated by the users is received.

For example, when Target Live Streaming Room A currently has 100 online viewers, and 50 viewers interact in the live streaming room at a current time node, a backend will receive the interaction data from the 50 viewers.

Step 102: determining an audience emotional atmosphere in the target live streaming room based on the interaction data.

Determination and analysis are performed based on the interaction data generated by the users, so as to determine an audience emotional atmosphere of the current target live streaming room.

Specifically, the audience emotional atmosphere that matches the current interaction data can be determined based on a mapping relationship between the interaction data and the audience emotional atmosphere.

Step 103: determining live streaming visual effects based on the audience emotional atmosphere.

After determining the audience emotional atmosphere, live streaming visual effects to be presented in the target live streaming room are determined based on the audience emotional atmosphere.

Specifically, this step may also determine the live streaming visual effects that match the current audience emotional atmosphere based on a mapping relationship between the audience emotional atmosphere and the live streaming visual effects.

Step 104: compositing the live streaming visual effects with alive streaming video to generate a composite live streaming video, and transmitting the composite live streaming video to the live streaming platform, such that the users can watch the composite live streaming video via the target live streaming room.

Finally, the determined live streaming visual effects are composited with the live streaming video being broadcasted by the streamer in the current target live streaming room to generate a composite live streaming video. It should be noted that the above-mentioned live streaming visual effects are presented in the composite live streaming video. The composite live streaming video is then transmitted to the live streaming platform, such that the viewers in the target live streaming room can watch the composite live streaming video.

Considering the problems of single method of interactive visual presentation, poor interactive visual effects, and low user stickiness caused by low user engagement of some users during the live streaming process, an embodiment of the present disclosure provides a live streaming-based interactive method. The method can determine an audience emotional atmosphere in the target live streaming room based on interaction data of a user in the target live streaming room, and then generate different live streaming visual effects to be presented in the live streaming video based on different audience emotional atmospheres. Through the method, bidirectional feedback between user interaction and the live streaming atmosphere is achieved. Each user interaction is used as a contribution to the presented live streaming visual effects, such that the presented live streaming visual effects is strongly associated with the user interaction, enhancing user immersion during the live streaming process and increasing user stickiness. Furthermore, the interactive method can strengthen the users' willingness to participate in the interaction, attracting more and more viewers to participate in the interaction. Moreover, the live streaming visual effects generated by the audience emotional atmosphere in the live streaming room can provide emotion-driven visual effects matching strategy. In terms of visual presentation, an atmosphere-based visual effect has stronger impact than the traditional method of tipping gift only.

In one embodiment, the interaction data includes at least one of tipping data, comment data, and like data.

Specifically, the tipping data refers to data generated by the user through a tipping action while watching a live stream. The tipping data may specifically include tipping gifts, virtual coins, or tipping effects triggered by monetary amounts. It should be noted that tipping data such as tipping gifts and virtual coins can directly reflect the users' excitement about the current live streaming content, which can improve the accuracy of recognizing subsequent audience emotional atmosphere.

The comment data refers to data generated by the user inputting a text or a character during the live streaming process. The comment data may be a text that scrolls in the live streaming video, for example, comments from a live chat interface or a bullet screen comments played according to time points during the live streaming. It should be noted that text-based data can directly reflect complex emotions of the viewers and provide more comprehensive emotional recognition.

The like data refers to data generated by the user clicking on icons on the screen or in a specific screen area during the live streaming process. It should be noted that the like data is simple to obtain, usually involves a largest data volume, and is suitable for accurate detection of long-term emotions with a relatively low misjudgment rate.

In one implementation mode, any one of the above-mentioned data may be used as the interaction data. For example, the interaction data may include only the tipping data, and the audience emotional atmosphere and the live streaming visual effects can be determined by analyzing the tipping data. Alternatively, the interaction data may include only the comment data, and the audience emotional atmosphere and the live streaming visual effects can be determined by analyzing the comment data. Alternatively, the interaction data may include only the like data, and the audience emotional atmosphere and the live streaming visual effects can be determined by analyzing the like data.

In another embodiment, any two of the above-mentioned data may be used as the interaction data. For example, the interaction data may include the tipping data and the comment data, and the audience emotional atmosphere and the live streaming visual effects can be determined by a comprehensive analysis of the tipping data and the comment data. Alternatively, the interaction data may include the tipping data and the like data, and the audience emotional atmosphere and the live streaming visual effects can be determined by a comprehensive analysis of the tipping data and the like data. Alternatively, the interaction data may include the comment data and the like data, and the audience emotional atmosphere and the live streaming visual effects can be determined by a comprehensive analysis of the comment data and the like data.

Of course, in one embodiment, the interaction data may simultaneously include the tipping data, the comment data, and the like data, and the audience emotional atmosphere and the live streaming visual effects can be determined by a comprehensive analysis of the tipping data, the comment data and the like data.

The Step 102: determining an audience emotional atmosphere in the target live streaming room based on the interaction data is described below through various embodiments.

In a first scenario, when the interaction data includes only the tipping data, the audience emotional atmosphere in the target live streaming room can be determined by using one or a combination of at least two of the following strategies.

A first strategy is to determine the number of user tips within a first target time period based on the tipping data, and then determine an audience emotional atmosphere in the target live streaming room based on the number of tips within the first target time period.

The first target time period may be determined according to actual needs, for example, the first target time period may be 20 seconds, 1 minute, 2 minutes, or the like. That is, the strategy can be understood as determining a current audience emotional atmosphere in the target live streaming room based on the number of user tips within the first target time period.

Specifically, different numbers of user tips correspond to different audience emotional atmospheres, and the number of tips may directly reflect the willingness of current viewers to participate in the interaction and their emotions.

Taking the first target time period of 20 seconds as an example, when the number of tips is 0-5 within the 20 seconds, it means that the audience emotional atmosphere in the live streaming room is indifferent; when the number of tips is 5-10 within the 20 seconds, it means that the audience emotional atmosphere in the live streaming room is calm; when the number of tips is 10-50 within the 20 seconds, it means that the audience emotional atmosphere in the live streaming room is active; and when the number of tips is more than 50 within the 20 seconds, it means that the audience emotional atmosphere in the live streaming room is enthusiastic. In this example, the audience emotional atmosphere includes indifferent, calm, active and enthusiastic.

After the number of tips within the first target time period is determined, a range of the number of tips can be determined according to the above example, and the audience emotional atmosphere in the target live streaming room can be then determined.

A second strategy is to determine the number of tippers within a second target time period based on the tipping data, and then determine the audience emotional atmosphere in the target live streaming room based on the number of tippers within the second target time period.

The second target time period may be determined according to actual needs, for example, the second target time period may be 10 seconds, 30 seconds, 1 minute, 2 minutes, or the like. Moreover, the second target time period may be the same as the first target time period described in the previous embodiment, which is not limited herein.

That is, the strategy can be understood as determining a current audience emotional atmosphere in the target live streaming room based on the number of tippers within the second target time period.

It should be noted that, unlike the number of tips, when the number of tippers is counted, a same user is only counted once. For example, when User A gives 10 tips within a time period, the number of tips will be 10 according to the first strategy; but the number of tips will be 1 according to the second strategy. Therefore, counting the number of tippers can more intuitively reflect the proportion of viewer participation and an overall interaction ratio of the viewers.

Different numbers of number of tippers correspond to different audience emotional atmospheres.

Taking the second target time period of 30 seconds as an example, when the number of tippers is 0-10 within the 30 seconds, it means that the audience emotional atmosphere in the live streaming room is indifferent; when the number of tippers is 10-20 within the 30 seconds, it means that the audience emotional atmosphere in the live streaming room is calm; when the number of tippers is 20-50 within the 30 seconds, it means that the audience emotional atmosphere in the live streaming room is active; and when the number of tippers is more than 50 within the 30 seconds, it means that the audience emotional atmosphere in the live streaming room is enthusiastic.

After the number of tippers within the second target time period is determined, a range of the number of tippers can be determined according to the above example, and the audience emotional atmosphere in the target live streaming room can be then determined.

A third strategy is to determine a tipping frequency in the target live streaming room based on the tipping data, and then determine the audience emotional atmosphere in the target live streaming room based on the tipping frequency.

That is, this strategy can be understood as determining the current audience emotional atmosphere in the target live streaming room based on the tipping frequency.

Specifically, different tipping frequencies correspond to different audience emotional atmospheres.

The tipping frequency is used to distinguish audience emotional intensity (different audience emotional intensities characterize different audience emotional atmospheres). The tipping frequency can be divided into high-frequency tips, medium-frequency tips, and low-frequency tips.

For example, high-frequency tips can be specifically defined as more than 100 tips per minute, and the audience emotional atmosphere corresponding to the high-frequency tips is excited. Medium-frequency tips can be specifically defined as more than 20-50 tips per minute, and the audience emotional atmosphere corresponding to the medium-frequency tips is active. Low-frequency tips can be specifically defined as more than 0-20 tips per minute, and the audience emotional atmosphere corresponding to the low-frequency tips is calm.

After the tipping frequency in the target live streaming room is determined, a range of the tipping frequency can be determined according to the above example, and the audience emotional atmosphere in the target live streaming room can be then determined.

A fourth strategy is to determine a continuous tipping duration in the target live streaming room based on the tipping data, and then determine the audience emotional atmosphere in the target live streaming room based on the continuous tipping duration.

That is, the strategy can be understood as determining the current audience emotional atmosphere in the target live streaming room based on the continuous tipping duration. It should be noted that the continuous tipping duration refers to a time period during which the tipping behavior of the viewers in the live streaming room continues, which can characterize the viewers' continuous attention and emotional engagement.

In practice, an interruption interval can be set to distinguish whether the tipping behavior is continuous. For example, the interruption interval can be set to 3 seconds, 4 seconds, 10 seconds, or the like. For example, after User A gives a tip, and the target live streaming room receives no more tips within 4 seconds, it can be determined that the continuous tipping duration of User A is interrupted, in which case, the continuous tipping duration needs to be recalculated from a next phase. Moreover, the above-mentioned interruption interval may be dynamically adjusted according to a number of online viewers in the live streaming room.

Specifically, different continuous tipping durations correspond to different audience emotional atmospheres. The continuous tipping duration can be classified as a short burst, a medium duration, and a long duration.

For example, the short burst may specifically be 30 seconds to 1 minute, which corresponds to an audience emotional atmosphere of momentary climax/excitement. The medium duration may specifically be 1 minute to 3 minutes, which corresponds to an audience emotional atmosphere of stable enthusiasm. The long duration may specifically be more than 3 minutes, which corresponds to an audience emotional atmosphere of fanaticism.

After the continuous tipping duration in the current live streaming room is determined, a range of the continuous tipping duration can be determined according to the above example, and the audience emotional atmosphere in the target live streaming room can be then determined.

In other strategies, an amount of the tipping gifts from the users may also be determined based on the tipping data, and the audience emotional atmosphere in the target live streaming room can be then determined based on the amount of the tipping gifts from the users.

In addition, the above strategies can be combined with each other to comprehensively determine the audience emotional atmosphere (such as by a weighted method). When the above strategies need to be combined, the types of the audience emotional atmosphere need to be unified.

In a second case, when the interaction data includes the tipping data, the comment data, and the like data at the same time, with reference to FIG. 2, the determination of the audience emotional atmosphere in the target live streaming room based on the interaction data of the user may specifically include steps 201-203.

Step 201: making a statistics of a number of tippers, a number of commenters and a number of likers based on the tipping data, the comment data, and the like data of the users.

Step 202: determining a weight allocation for the tipping data, the comment data, and the like data of the users based on the number of tippers, the number of commenters and the number of likers.

It should be noted that the larger the number of users, the higher the weight allocated.

For example, when the number of tippers is 40, the number of commenters is 10, and the number of likers is 50, the weight allocated to the tipping data may be 0.4, the weight allocated to the comment data may be 0.1, and the weight allocated to the like data may be 0.5.

Step 203: determining the audience emotional atmosphere in the target live streaming room based on the tipping data, the comment data, and the like data of the users, as well as their respective allocated weights.

Finally, the current audience emotional atmosphere in the target live streaming room is comprehensively analyzed and determined based on the tipping data, the comment data, and the like data of the users, as well as their respective allocated weights.

In this embodiment, an emotional score can be determined respectively based on the tipping data, the comment data, and the like data of the users, and a range of the emotional score is 0-100. A total emotional score can be then determined by combining the respective weights. Different values of the emotional score correspond to different audience emotional atmospheres.

For example, an emotional score of 0-20 may characterize that the audience emotional atmosphere in the live streaming room is indifferent, an emotional score of 20-40 may characterize that the audience emotional atmosphere in the live streaming room is calm, an emotional score of 40-80 may characterize that the audience emotional atmosphere in the live streaming room is active, and an emotional score of more than 80 may characterize that the audience emotional atmosphere in the live streaming room is enthusiastic.

Optionally, the audience emotional atmosphere may include an audience emotional atmosphere category.

As described in the previous embodiments, the audience emotional atmosphere category may include indifferent, calm, active and enthusiastic. The audience emotional atmosphere category may also include climax/excitement, stable enthusiasm, and fanaticism. The audience emotional atmosphere category may also include excited, active and calm. Specific category may be set according to actual needs.

Of course, the audience emotional atmosphere category may also include emotions such as happiness, joy, tension, and disappointment.

Optionally, the audience emotional atmosphere may also include an audience emotional change trend.

That is, this embodiment provides a method for determining live streaming visual effects based on the audience emotional change trend. For example, the audience emotional change trend may change from indifferent to calm, or from enthusiastic to active, etc. Different live streaming visual effects are matched to different audience emotional change trends. That is, the live streaming visual effects conform to the audience emotional change trend, which is a dynamic display process. The method further strengthens the matching of emotion-driven visual effects, and can present the process of audience emotional changes through the visual effects. For example, the audience emotional trend change is from calm to active, the live streaming visual effects may be a gradually blooming or an increasingly large firework display.

In addition, the audience emotional atmosphere may also be presented in a numerical way. As described in the previous embodiments, an emotional score of 0-20 may characterize that the audience emotional atmosphere in the live streaming room is indifferent, an emotional score of 20-40 may characterize that the audience emotional atmosphere in the live streaming room is calm, an emotional score of 40-80 may characterize that the audience emotional atmosphere in the live streaming room is active, and an emotional score of more than 80 may characterize that the audience emotional atmosphere in the live streaming room is enthusiastic.

The live streaming visual effects in this embodiment are further described below.

In one embodiment, the live streaming visual effects may include at least one of the following: gift visual effects, action visual effects, facial expression visual effects, text visual effects, user identity document (ID) visual effects, background visual effects, and streamer ornament visual effects.

Specifically, the gift visual effects may correspond to the tipping gifts from the users. For example, the tipping gifts from the users may include flowers, airplanes, rockets, sports cars, cakes, rings, glow sticks, and the like. Subsequently, gift visual effects may be generated based on the audience emotional atmosphere and the tipping gifts from the users.

For example, when the tipping gift from a user is a rocket, and the audience emotional atmosphere is excited, the gift visual effects may be continuous and full-screen rocket launches.

The action visual effects may be virtual action visual effects corresponding to the streamer's actions. For example, when the current streamer jumps in the live streaming room and the audience emotional atmosphere is determined to be excited, virtual jumping action effects of the streamer may be generated to emphasize the users' liking for the streamer's action in the current live streaming.

Facial expression visual effects may correspond to the streamer's dynamic facial expressions or correspond to the audience emotional atmosphere. For example, when the streamer's dynamic facial expression is excited and the audience emotional atmosphere is also excited, the facial expression visual effects may be constructed based on the streamer's dynamic facial expression. Alternatively, when the audience emotional atmosphere is excited, any facial expression visual effects having an excited expression may be selected from a facial expression library.

The text visual effects may be presented in the form of an animated text explosion. The specific text content of the text visual effects can be used to characterize the current audience emotional atmosphere, such as "so interesting," "really funny," "keep going," and "change it, change it."

The user ID visual effects may refer to an ID of the user who participates in the interaction can be fully displayed on the screen when the current audience emotional atmosphere is fanatical.

The background visual effects may switch to different backgrounds according to the different audience emotional atmospheres. For example, when the audience emotional atmosphere is calm, the background visual effects are switched to ordinary room background visual effects, and when the audience emotional atmosphere is fanatical, the background visual effects are switched to game background visual effects.

The streamer ornament visual effects refer to switching different ornament visual effects for the streamer based on different audience emotional atmospheres. For example, the streamer ornament visual effects may be headscarf visual effects, helmet visual effects, sunglasses visual effects, backpack visual effects, tie visual effects, and the like. When the audience emotional atmosphere is calm, the streamer ornament visual effects may be the headscarf visual effects; and when the audience emotional atmosphere is fanatical, the streamer ornament visual effect may be exploding helmet visual effects.

Of course, the live streaming visual effects may also include combination of the aforementioned visual effects. Specifically, when the audience emotional atmosphere is fanatical, the action visual effects with a countdown may first be displayed, followed by huge fireworks gift visual effects.

The gift visual effects are described in detail below.

In one embodiment, the step 103 of determining the live streaming visual effects based on the audience emotional atmosphere, which may specifically include: determining the live streaming visual effects based on the audience emotional atmosphere and tipping gifts from the users.

That is, the live streaming visual effects are the gift visual effects, different gift visual effects are presented through changes in the audience emotional atmosphere in combination with the tipping gifts from the users, thereby improving a visual effect.

Specifically, the process may include: determining a visual effect processing mode for the tipping gifts from the users based on the audience emotional atmosphere; where the visual effect processing mode includes a gift magnification ratio or a gift composition method; processing tipping gifts from the users based on the visual effect processing mode; where the processed tipping gifts from the users are the live streaming visual effects.

That is, this embodiment provides two visual effect processing modes. The first visual effect processing mode is the gift magnification ratio. Specifically, after the audience emotional atmosphere is determined, the gift magnification ratio is determined based on the audience emotional atmosphere.

For example, when the audience emotional atmosphere is indifferent, the gift magnification ratio is 1; when the audience emotional atmosphere is calm, the gift magnification ratio is 1.5; when the audience emotional atmosphere is active, the gift magnification ratio is 2; and when the audience emotional atmosphere is enthusiastic, the gift magnification ratio is 4. Moreover, when the audience emotional atmosphere is enthusiastic, the gifts are displayed in at least half of the live streaming screen to present the current enthusiastic atmosphere in the live streaming room.

For example, the gift magnification ratio can be determined based on a numerical value of the audience emotional atmosphere. Specifically, when the numerical value of the audience emotional atmosphere is 0-20, the gift magnification ratio is 1; when the numerical value of the audience emotional atmosphere is 20-40, the gift magnification ratio is 1.2; when the numerical value of the audience emotional atmosphere is 40-70, the gift magnification ratio is 2; and when the numerical value of the audience emotional atmosphere is 70-100, the gift magnification ratio is 5.

It should be noted that the larger the gift magnification ratio, the more enthusiastic the atmosphere in the live streaming room.

The second visual effect processing mode is the gift composition method. Specifically, after the audience emotional atmosphere is determined, the gift composition method is determined based on the audience emotional atmosphere.

For example, when the audience emotional atmosphere is indifferent, the gift composition method is simple overlay of gifts. For example, when the tipping gifts from the users are flowers, and the audience emotional atmosphere is indifferent, identical tipping gifts such as flowers are overlapped or displayed side-by-side. When the audience emotional atmosphere is calm, the gift composition method is the magnification and fusion of gifts, for example, identical tipping gifts such as flowers are merged into a larger flower. When the audience emotional atmosphere is active, the gift composition method is advanced fusion of gifts, for example, identical tipping gifts such as flowers are merged into a more premium flower; specifically, ordinary small red flowers are fused into a rose. When the audience emotional atmosphere is enthusiastic, the gift composition method is advanced fusion and magnification of gifts, for example, identical tipping gifts such as flowers are merged into a more premium flower, and the more premium flower is magnified for display; specifically, ordinary small red flowers are fused into a rose, and magnified for display.

Of course, other examples of the gift composition method are also possible. For example, identical motorcycles can be clustered together and combined into a higher-level motorcycle; and when five users tip fireworks, a large firework can be merged to bloom together. It can be seen that the above processing methods for gift visual effects further enhance the visual presentation effect during interaction, and the above methods provide richer and more diverse visual effects.

Optionally, the steps of compositing the live streaming visual effects with a live streaming video may further include: adding the live streaming visual effects to a first region in the live streaming video; adding the tipping gifts from the users to a second region in the live streaming video; where the first region and the second region are located at different positions in the live streaming video.

In other words, during the live streaming process, the live streaming visual effects and tipping gifts from the users can be simultaneously presented to the users watching the live stream, and the live streaming visual effects and tipping gifts from the users are visually layered to further enhance an interactive effect.

Optionally, the first region corresponds to a central area of the live streaming video, and the second region corresponds to a top area of the live streaming video or a bottom area of the live streaming video.

In this embodiment, by adding the live streaming visual effects to the central area (highlighting the live streaming visual effects), the user's sense of immersion can be maximized, resulting in a strong interactive effect.

Optionally, this embodiment further pre-constructs a mapping table, and determines the live streaming visual effects via the pre-constructed mapping table. That is, the above step of determining the live streaming visual effects based on the audience emotional atmosphere may specifically include: determining visual effects matching the audience emotional atmosphere from a pre-constructed mapping table; where the pre-constructed mapping table includes visual effects corresponding to different audience emotional atmospheres; where the matched visual effects are the live streaming visual effects.

The pre-constructed mapping table is described by way of example:

when the audience emotional atmosphere is excited, the corresponding live streaming effect is fireworks bursting;
  when the audience emotional atmosphere is indifferent, the corresponding live streaming effect is light rain; and
  when the audience emotional atmosphere is unhappy, the corresponding live streaming effect is screen cracks.

Optionally, in the pre-constructed mapping table, one audience emotional atmosphere may correspond to at least two different visual effects. For example, when the audience emotional atmosphere is excited, the corresponding live streaming effect may be either fireworks bursting or flashing lights.

Accordingly, the step of determining visual effects matching the audience emotional atmosphere from a pre-constructed mapping table may include randomly determining one visual effect matching the audience emotional atmosphere from the pre-constructed mapping table.

It should be noted that since each audience emotional atmosphere may correspond to at least two different visual effects, when the one visual effect that matches the audience emotional atmosphere is randomly determined in actual application, the live streaming visual effects can be prevented from stereotyping or fixed, which breaks audience expectations, creating surprise for the users watching the live stream, increases the expectation of users for different live streaming visual effects, and thereby improves audience retention time.

Optionally, the step of determining visual effects matching the audience emotional atmosphere from a pre-constructed mapping table may further include determining at least two visual effects matching the audience emotional atmosphere from the pre-constructed mapping table; and determining the live streaming visual effects for compositing from the at least two visual effects matching the audience emotional atmosphere based on a duration of the live streaming.

Specifically, the duration of live streaming refers to a length of time period that the streamer has been streamed. For example, the duration of live streaming may be 5 minutes, 1 hour, 3 hours, or 5.5 hours.

The above steps are described below by way of examples. When the audience emotional atmosphere is excited, the corresponding live streaming visual effects determined from the pre-constructed mapping table may include fireworks bursting or flashing lights. When the duration of the current live streaming is 5 minutes, it indicates that the streamer has just started the live streaming, in which case, the live streaming visual effects can be flashing lights to enhance the atmosphere warm-up at a beginning of the live streaming. When the duration of the current live streaming is 3 hours, it indicates that the streamer is approaching its conclusion, in which case, the live streaming visual effects that can be determined are fireworks bursting to create a closing or farewell atmosphere. The immersion experience and viewer engagement can be further enhanced through the above methods.

With reference to FIG. 3, an embodiment of the present disclosure further provides a live streaming system 30, which is described below.

The live streaming system 30 may include: a live streaming platform 301, a user terminal 302, an application programming interface (API) 303, a browser 304, an open broadcaster software (OBS) operation unit 305, and an OBS unit 306.

Specifically, the user terminal 302 corresponds to the viewers accessing the live streaming platform 301. The API 303 provides an interface for the required data through a protocol. The browser 304 is a browser used by the streamer to log into the live streaming platform 301. It may be developed based on an open-source browser and obtain the API 303 and live streaming related data through a development script. The OBS operation unit 305 is configured to fuse the visual effects to be presented with real-time data of the live streaming video into new video display content, which can present visual effects in the live streaming room. That is, it is configured to perform some steps of the live streaming-based interactive method provided in the above embodiments. The OBS unit 306 is configured to output the fused video content to the live streaming platform 301.

Figure 4:
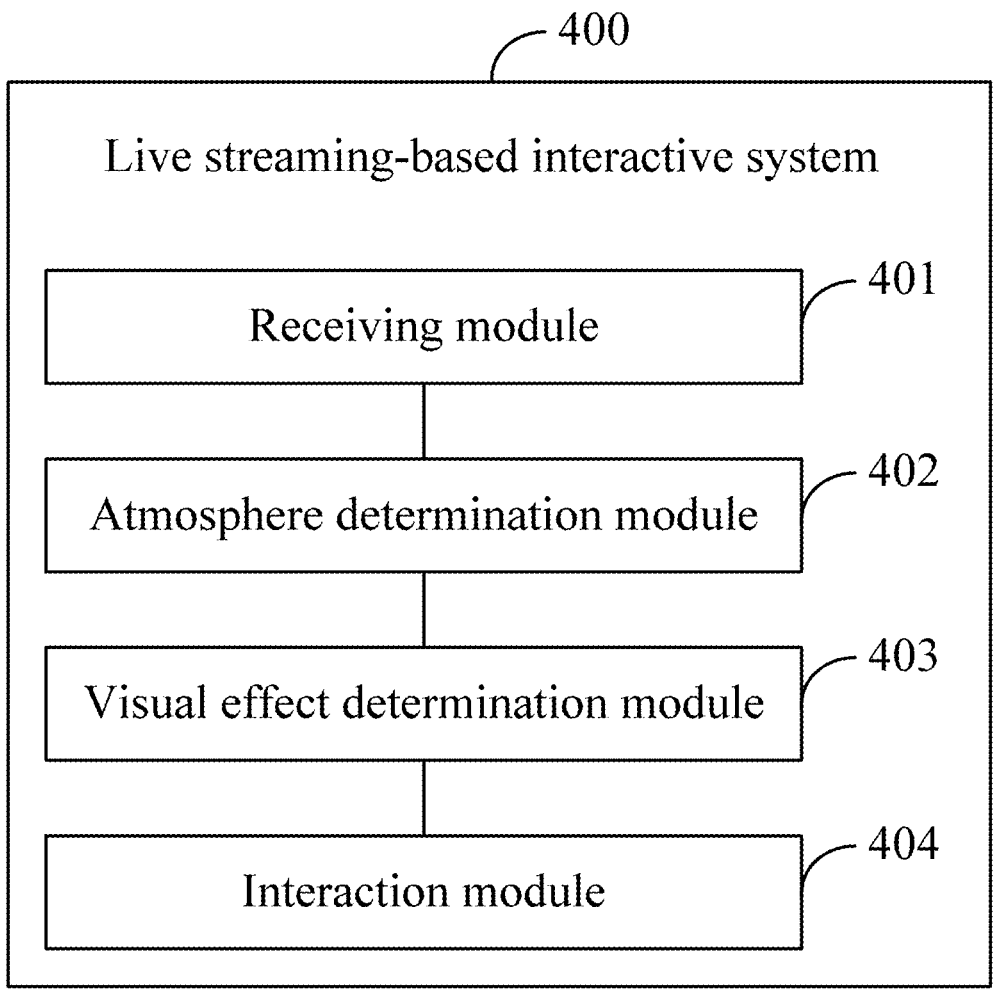
FIG. 4 is a block diagram of a live streaming-based interactive system according to an embodiment of the present disclosure.

With reference to FIG. 4, based on the same inventive concept, an embodiment of the present disclosure further provides a live streaming-based interactive system 400, including:

a receiving module 401 configured to receive interaction data of users; where the users are viewers watching a target live streaming room on a live streaming platform.
  an atmosphere determination module 402 configured to determine an audience emotional atmosphere in the target live streaming room based on the interaction data.
  a visual effect determination module 403 configured to determine live streaming visual effects based on the audience emotional atmosphere.
  an interaction module 404 configured to composite the live streaming visual effects with a live streaming video to generate a composite live streaming video, and transmitting the composite live streaming video to the live streaming platform, such that the users can watch the composite live streaming video via the target live streaming room.

Figure 5:
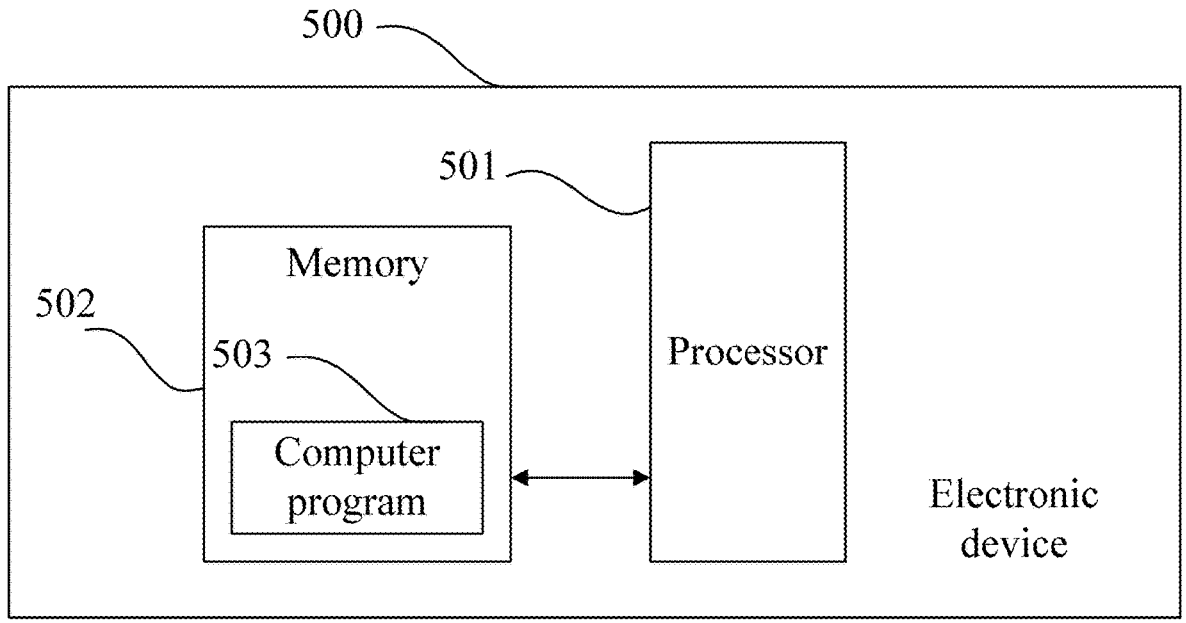
FIG. 5 is a block diagram of an electronic device according to an embodiment of the present disclosure.

With reference to FIG. 5, based on the same inventive concept, an embodiment of the present disclosure further provides a module frame of an electronic device 500 applying the above method. The electronic device 500 includes: at least one processor 501 (only one processor is shown in FIG. 5), a memory 502, and a computer program 503 stored in the memory 502 and executable on the at least one processor 501. When the processor 501 executes the computer program 503, the steps of the method in any of the above embodiments are implemented.

Those skilled in the art can understand that FIG. 5 is merely an example of an electronic device 500 and does not constitute a limitation on the electronic device 500, which can include more or fewer components than those illustrated, or combination of certain components, or different components.

The processor 501 may be a central processing unit (CPU), or the processor 501 may be other general-purpose processor, digital signal processor (DSP), application-specific integrated circuit (ASIC), field-programmable gate array (FPGA), or other programmable logic device, discrete gate or transistor logic device, discrete hardware component, and the like. The general-purpose processor can be a microprocessor, or any conventional processor.

In some embodiments, the memory 502 may be an internal storage unit of the electronic device 500, such as a hard disk or memory of the electronic device 500. In other embodiments, the memory 502 may be an external storage device of the electronic device 500, such as a plug-in hard drive, a smart media card (SMC), a secure digital (SD) card, a flash card, or the like attached to the electronic device 500. Further, the memory 502 may include both the internal storage unit and the external storage device of the electronic device 500.

It should be noted that the above-mentioned systems, devices, etc. are based on the same inventive concept as the method embodiments of the present disclosure, their designed modules, the steps executed by the devices, and the technical effects achieved may be referred to in the description of the method embodiments, which will not be repeated herein.

Those skilled in the art can clearly understand that for convenience and conciseness of description, only the division of the above functional units or modules is given by way of example. In practical application, the above functions may be allocated to different functional units or modules, as needed; that is, an internal structure of the device may be divided into different functional units or modules to complete all or part of the functions described above. The functional units or modules in the embodiments may be integrated into one processing unit, or each unit may exist physically separately, or two or more units may be integrated together into one unit. The above integrated unit can be implemented in the form of hardware or in the form of a software functional unit. In addition, the specific names of the functional units or modules are only given for ease of distinction and are not intended to limit the scope of protection of the present disclosure. The specific working process of the units or modules in the above system can be referred to the corresponding process in the embodiments, which will not be described in detail herein.

An embodiment of the present disclosure further provides a computer-readable storage medium, which stores a computer program, where the computer program is executed by a processor, and the steps of the method in any of the above embodiments can be implemented.

An embodiment of the present disclosure also provides a computer program product, when the computer program product is executed on a mobile terminal, the mobile terminal is enabled to implement the steps of the method in any of the above embodiments.

When the integrated unit is implemented as software functional units and sold or used as independent products, it can be stored in a computer-readable storage medium. Those skilled in the art may understand that implementation of all or some procedures in the methods of the above embodiments may be accomplished by instructing related hardware by means of a computer program. The computer program can be stored in the computer-readable storage medium, and when the computer program is executed, the procedures of the above embodiment for the method can be included. The computer program includes computer program code, the computer program code can be in the form of source code, object code, executable file or some intermediate form. The computer-readable medium may at least include any entity or device capable of carrying the computer program code to the photo device/electronic device, recording media, computer memory, Read-Only Memory (ROM), Random Access Memory (RAM), electric carrier signals, telecommunication signals, and software distribution media, such as a USB flash drive, a mobile hard disk, a magnetic disk, or an optical disk.

In the above embodiments, the descriptions of all embodiments have their respective focuses. Any part not recorded or described in one embodiment may be referred to in the relevant descriptions of other embodiments.

Those ordinary skill in the art may realize that units and algorithm steps of various examples described with reference to the embodiments disclosed herein may be implemented by electronic hardware, or a combination of computer software and electronic hardware. Whether the functions are executed in hardware or software depends on the specific application and design constraints of the technical solution. Those skilled in the art may use different methods to implement the described functions for each particular application, but such implementation should not be considered to be beyond the scope of the present disclosure.

In the embodiments provided in the present application, it should be understood that the disclosed equipment/network device and method can be implemented in other ways. For example, the embodiments about the equipment/network device described above are merely illustrative, for example, the division of the modules or units is only a logical function division, there may be additional divisions in actual implementation, for example, multiple units or components may be combined or integrated into another system, or some features may be ignored, or not implemented. In addition, the mutual coupling or direct coupling or communication connection shown or discussed may be an indirect coupling or communication connection through some interface, device or unit, and may be electrical, mechanical or otherwise.

The units described as separate components may or may not be physically separated, and a component displayed as a unit may or may not be a physical unit, that is, the component may be located at one place, or distributed on a plurality of network units. Part or all of the units may be selected according to actual requirements to achieve the objective of the solution of the embodiments.

To sum up, the above embodiments are merely intended for describing the technical solution of the present disclosure rather than limiting the present disclosure. Although the present disclosure is described in detail with reference to the above embodiments, those of ordinary skill in the art should understand that they can still make modifications to the technical solution described in the embodiments or equivalent substitutions to some technical features of the technical solution. These modifications or substitutions do not enable the corresponding technical solution to depart from the spirit and scope of the technical solutions in all the embodiments of the present disclosure, and should fall within the scope of protection of the present disclosure.

What is claimed is:

1. A live streaming-based interactive method, comprising:

receiving interaction data of users, wherein the users are viewers watching a target live streaming room on a live streaming platform, the interaction data including tipping data, comment data, and like data of the users;

making a statistic of a number of tippers, a number of commenters, and a number of likers based on the tipping data, the comment data, and the like data;

determining a weight allocation for the tipping data, the comment data, and the like data based on the number of tippers, the number of commenters and the number of likers;

determining an audience emotional atmosphere in the target live streaming room based on the tipping data, the comment data, and the like data, as well as their respective allocated weights;

determining live streaming visual effects based on the audience emotional atmosphere; and compositing the live streaming visual effects with a live streaming video to generate a composite live streaming video, and transmitting the composite live streaming video to the live streaming platform, so as to enable the users to watch the composite live streaming video via the target live streaming room.

2. The live streaming-based interactive method according to claim 1, wherein the audience emotional atmosphere in the target live streaming room is also determined based on a number of user tips within a first target time period.

3. The live streaming-based interactive method according to claim 1, wherein the audience emotional atmosphere in the target live streaming room is also determined based on a number of tippers within a second target time period.

4. The live streaming-based interactive method according to claim 1, wherein the audience emotional atmosphere in the target live streaming room is also determined based on a frequency of tips in the target live streaming room.

5. The live streaming-based interactive method according to claim 1, wherein the audience emotional atmosphere in the target live streaming room is also determined based on a continuous tipping duration in the target live streaming room.

6. The live streaming-based interactive method according to claim 1, wherein the audience emotional atmosphere comprises an audience emotional atmosphere category.

7. The live streaming-based interactive method according to claim 1, wherein the audience emotional atmosphere comprises an audience emotional change trend.

8. The live streaming-based interactive method according to claim 1, wherein the determining live streaming visual effects based on the audience emotional atmosphere comprises:

determining the live streaming visual effects based on the audience emotional atmosphere and tipping gifts from the users.

9. The live streaming-based interactive method according to claim 1, wherein the live streaming visual effects comprises at least one of gift visual effects, action visual effects, facial expression visual effects, text visual effects, user ID visual effects, background visual effects, and streamer ornament visual effects.

10. The live streaming-based interactive method according to claim 1, wherein the determining live streaming visual effects based on the audience emotional atmosphere comprises:

determining visual effects matching the audience emotional atmosphere from a pre-constructed mapping table; wherein the pre-constructed mapping table comprises visual effects corresponding to different audience emotional atmospheres; wherein the matched visual effects are the live streaming visual effects.

11. The live streaming-based interactive method according to claim 8, wherein the determining the live streaming visual effects based on the audience emotional atmosphere and tipping gifts from the users comprises:

determining a visual effect processing mode for the tipping gifts from the users based on the audience emotional atmosphere; and processing the tipping gifts from the users based on the visual effect processing mode; wherein the processed tipping gifts from the users are the live streaming visual effects.

12. The live streaming-based interactive method according to claim 11, wherein the visual effect processing mode comprises a gift magnification ratio or a gift composition method.

13. The live streaming-based interactive method according to claim 11, wherein the compositing the live streaming visual effects with a live streaming video comprises:

adding the live streaming visual effects to a first region in the live streaming video; and adding the tipping gifts from the users to a second region in the live streaming video; wherein the first region and the second region are located at different positions in the live streaming video.

14. The live streaming-based interactive method according to claim 13, wherein the first region corresponds to a central area of the live streaming video, and the second region corresponds to a top area of the live streaming video, or the second region corresponds to a bottom area of the live streaming video.

15. The live streaming-based interactive method according to claim 10, wherein in the pre-constructed mapping table, one audience emotional atmosphere corresponds to at least two different visual effects.

16. The live streaming-based interactive method according to claim 15, wherein the determining visual effects matching the audience emotional atmosphere from a pre-constructed mapping table comprises:

randomly determining one visual effect matching the audience emotional atmosphere from the pre-constructed mapping table.

17. The live streaming-based interactive method according to claim 15, wherein the determining visual effects matching the audience emotional atmosphere from a pre-constructed mapping table comprises:

determining at least two visual effects matching the audience emotional atmosphere from the pre-constructed mapping table; and determining the live streaming visual effects for compositing from the at least two visual effects matching the audience emotional atmosphere based on a duration of the live streaming.

18. A live streaming-based interactive system, comprising:

a receiving module configured to receive interaction data of users; wherein the users are viewers watching a target live streaming room on a live streaming platform, the interaction data including tipping data, comment data, and like data of the users;

an atmosphere determination module configured to: make a statistic of a number of tippers, a number of commenters, and a number of likers based on the tipping data, the comment data, and the like data; determine a weight allocation for the tipping data, the comment data, and the like data based on the number of tippers, the number of commenters and the number of likers; and determine an audience emotional atmosphere in the target live streaming room based on the tipping data, the comment data, and the like data, as well as their respective allocated weights;

a visual effect determination module configured to determine live streaming visual effects based on the audience emotional atmosphere; and an interaction module configured to composite the live streaming visual effects with a live streaming video to generate a composite live streaming video, and transmitting the composite live streaming video to the live streaming platform, so as to enable the users to watch the composite live streaming video via the target live streaming room.

\* \* \* \* \*